US009007403B2

(12) United States Patent
Su et al.

(10) Patent No.: US 9,007,403 B2
(45) Date of Patent: Apr. 14, 2015

(54) PROJECTOR, PROJECTING SYSTEM COMPRISING THE SAME AND AUTOMATIC IMAGE ADJUSTING METHOD THEREOF

(75) Inventors: Tzu-Wei Su, Taoyuan Hsien (TW); Yu-Min Hsiao, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 258 days.

(21) Appl. No.: 13/605,819

(22) Filed: Sep. 6, 2012

(65) Prior Publication Data

US 2013/0271496 A1    Oct. 17, 2013

(30) Foreign Application Priority Data

Apr. 17, 2012  (TW) .............................. 101113538 A

(51) Int. Cl.
*G09G 5/00* (2006.01)
*H04N 9/31* (2006.01)
*G06F 3/14* (2006.01)

(52) U.S. Cl.
CPC ................ *H04N 9/3173* (2013.01); *G06F 3/14* (2013.01); *G09G 2340/0492* (2013.01); *G09G 2370/022* (2013.01); *H04N 9/3185* (2013.01); *H04N 9/3194* (2013.01)

(58) Field of Classification Search
None
See application file for complete search history.

(56) References Cited

U.S. PATENT DOCUMENTS

| | | | |
|---|---|---|---|
| RE42,639 E * | 8/2011 | Anderson | 348/272 |
| 2002/0038462 A1* | 3/2002 | Sakakibara et al. | 725/151 |
| 2006/0290896 A1* | 12/2006 | Nishida | 353/69 |
| 2008/0055474 A1 | 3/2008 | Chen et al. | |
| 2008/0100638 A1 | 5/2008 | Chee et al. | |
| 2010/0053147 A1* | 3/2010 | Choi et al. | 345/214 |
| 2012/0069150 A1* | 3/2012 | Rivera | 348/46 |
| 2012/0176587 A1* | 7/2012 | Waltermann et al. | 353/70 |
| 2012/0223972 A1* | 9/2012 | Hsu | 345/659 |

FOREIGN PATENT DOCUMENTS

| | | |
|---|---|---|
| CN | 101540816 | 9/2009 |
| TW | 200603045 A | 1/2006 |
| TW | 200813601 A | 3/2008 |
| TW | M333631 | 6/2008 |

* cited by examiner

*Primary Examiner* — David Zarka
*Assistant Examiner* — Khoa Vu
(74) *Attorney, Agent, or Firm* — Muncy, Geissler, Olds & Lowe, P.C.

(57) ABSTRACT

A projector, a projecting system comprising the same and an automatic image adjusting method thereof are provided. The projector co-operates with a server of the projecting system and projects an initial image at a first orientation. The projector senses an angle difference value generated while the first orientation of the projector is changed to a second orientation, and generates an angle signal according to the angle difference value. The projector transmits the angle signal to the server so that the server generates a rotated image signal according to the angle signal and transmits the rotated image signal to the projector. The projector converts the rotated image signal into a rotated image, and projects the rotated image at the second orientation.

18 Claims, 7 Drawing Sheets

| Angle difference value θ | sin θ | cos θ |
|---|---|---|
| 0 | 0.00 | 1.00 |
| 15 | 0.26 | 0.97 |
| 30 | 0.50 | 0.87 |
| 45 | 0.71 | 0.71 |
| 60 | 0.87 | 0.50 |
| 75 | 0.97 | 0.26 |
| 90 | 1.00 | 0.00 |
| 105 | 0.97 | -0.26 |
| 120 | 0.87 | -0.50 |
| 135 | 0.71 | -0.71 |
| 150 | 0.50 | -0.87 |
| 165 | 0.26 | -0.97 |
| 180 | 0.00 | -1.00 |
| 195 | -0.26 | -0.97 |
| 210 | -0.50 | -0.87 |
| 225 | -0.71 | -0.71 |
| 240 | -0.87 | -0.50 |
| 255 | -0.97 | -0.26 |
| 270 | -1.00 | 0.00 |
| 285 | -0.97 | 0.26 |
| 300 | -0.87 | 0.50 |
| 315 | -0.71 | 0.71 |
| 330 | -0.50 | 0.87 |
| 345 | -0.26 | 0.97 |

Table 1

FIG. 5

PROJECTOR, PROJECTING SYSTEM COMPRISING THE SAME AND AUTOMATIC IMAGE ADJUSTING METHOD THEREOF

This application claims priority to Taiwan Patent Application No. 101113538 filed on Apr. 17, 2012.

CROSS-REFERENCES TO RELATED APPLICATIONS

Not applicable.

BACKGROUND OF THE INVENTION

1. Field of the Invention

The present invention relates to a projector, a projecting system comprising the projector and an automatic image adjusting method thereof. More particularly, the projector of the present invention can adjust an image aspect of an image according to an orientation of the projector.

2. Descriptions of the Related Art

As projector related technologies become sophisticated gradually, various kinds of projectors have found wide application in households and enterprises. Conventionally, when a user uses a common projector to watch images, the projector must be firstly placed at a position securely to prevent sway of the projector so that quality and stability of the images projected can be maintained.

To cater for demands in use, more and more projectors are now required to be designed with a small volume to facilitate their use in image playing or even to allow the user to handhold the projectors for image projection. Therefore, in use of such a highly mobile projector, it is possible that the projector is rotated at any time to adapt to the service environment.

However, rotation of the projector will directly cause skew of an image projected by the projector. Therefore, if, when the user is using the projector to play images, an orientation at which the projector plays the images changes, then the user must manually adjust the orientation of the projector according to the skewed image so that the image played is restored to a normal image aspect. This makes it inconvenient for the user to use the projector.

Accordingly, an urgent need exists in the art to overcome the aforesaid shortcoming so as to improve convenience in use of the projector.

SUMMARY OF THE INVENTION

To solve the aforesaid problem caused when an orientation of the projector is changed, the present invention provides a projector, a projecting system comprising the projector and an automatic image adjusting method thereof, which can detect a change in orientation of the projector and automatically adjust a projection image.

To achieve the aforesaid objective, the present invention provides a projector, which comprises a transceiver, an image converter, a projecting module and an angle sensor. The transceiver is configured to receive an initial image signal from a server. The image converter is electrically coupled to the transceiver and configured to convert the initial image signal into an initial image. The projecting module is electrically coupled to the image converter and configured to project the initial image at a first orientation of the projector. The angle sensor is configured to sense an angle difference value generated while the first orientation of the projector is changed to a second orientation, and to generate an angle signal according to the angle difference value. The transceiver transmits the angle signal to the server so that the server generates a rotated image signal according to the angle signal and the initial image signal. The transceiver receives the rotated image signal from the server. The image converter generates a rotated image according to the rotated image signal. The projecting module projects the rotated image at the second orientation of the projector, and the rotated image and the initial image have the same image aspect.

To achieve the aforesaid objective, the present invention also provides an automatic image adjusting method for use in a projector. The projector co-operates with a server. The automatic image adjusting method comprises the following steps: (a) enabling the projector to receive an initial image signal from the server, and to project an initial image at a first orientation according to the initial image signal; (b) enabling the projector to sense an angle difference value generated while the first orientation of the projector is changed to a second orientation; (c) enabling the projector to generate an angle signal according to the angle difference value, and to transmit the angle signal to the server so that the server generates a rotated image signal according to the angle signal and the initial image signal; and (d) enabling the projector to receive the rotated image signal from the server, and to project a rotated image at the second orientation according to the rotated image signal, wherein the rotated image and the initial image have the same image aspect.

To achieve the aforesaid objective, the present invention provides a projecting system, which comprises a server and a projector. The server comprises a processing unit and a first transceiver. The projector comprises a second transceiver, an image converter, a projecting module and an angle sensor. The processing unit is configured to generate an initial image signal. The first transceiver is electrically coupled to the processing unit and configured to transmit the initial image signal. The second transceiver is configured to receive the initial image signal from the server. The image converter is electrically coupled to the second transceiver and configured to convert the initial image signal into an initial image. The projecting module is electrically coupled to the image converter and configured to project the initial image at a first orientation of the projector.

The angle sensor is configured to sense an angle difference value generated while the first orientation of the projector is changed to a second orientation, and to generate an angle signal according to the angle difference value. The second transceiver transmits the angle signal to the server while the first orientation of the projector is changed to the second orientation. The processing unit generates a rotated image signal according to the angle signal and the initial image signal after the first transceiver receives the angle signal. The first transceiver transmits the rotated image signal to the projector. The image converter generates a rotated image according to the rotated image signal after the second transceiver receives the rotated image signal. The projecting module projects the rotated image at the second orientation, and the rotated image and the initial image projected by the projector at the first orientation have the same image aspect.

To achieve the aforesaid objective, the present invention also provides an automatic image adjusting method for use in a projecting system. The projecting system comprises a projector and a server. The automatic image adjusting method comprises the following steps: (a) enabling the projector to receive an initial image signal from the server, and to project an initial image at a first orientation according to the initial image signal; (b) enabling the projector to sense an angle difference value generated while the first orientation of the projector is changed to a second orientation; (c) enabling the projector to generate an angle signal according to the angle difference value, and to transmit the angle signal to the server; (d) enabling the server to generate a rotated image signal according to the angle signal and the initial image signal, and to transmit the rotated image signal to the projector; and (e) enabling the projector to receive the rotated image signal from the server, and to project a rotated image at the second orientation according to the rotated image signal. The initial image projected by the projector at the first orientation and the rotated image projected at the second orientation have the same image aspect.

With the technical features disclosed above, the projector, the projecting system comprising the projector and the automatic image adjusting method thereof of the present invention can detect a change in orientation of the projector and automatically adjust a projection image. In this way, convenience in operation of the projector is improved. The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 5 illustrates a specific rotated angle corresponding table according to the second embodiment of the present invention;

DESCRIPTION OF THE PREFERRED EMBODIMENT

In the following descriptions, the present invention will be explained with reference to embodiments thereof. However, these embodiments are not intended to limit the present invention to any environments, applications or implementations described in these embodiments. Therefore, description of these embodiments is only for purpose of illustration rather than to limit the present invention. It shall be appreciated that, in the following embodiments and the attached drawings, elements not directly related to the present invention are omitted from depiction.

Figure 1:
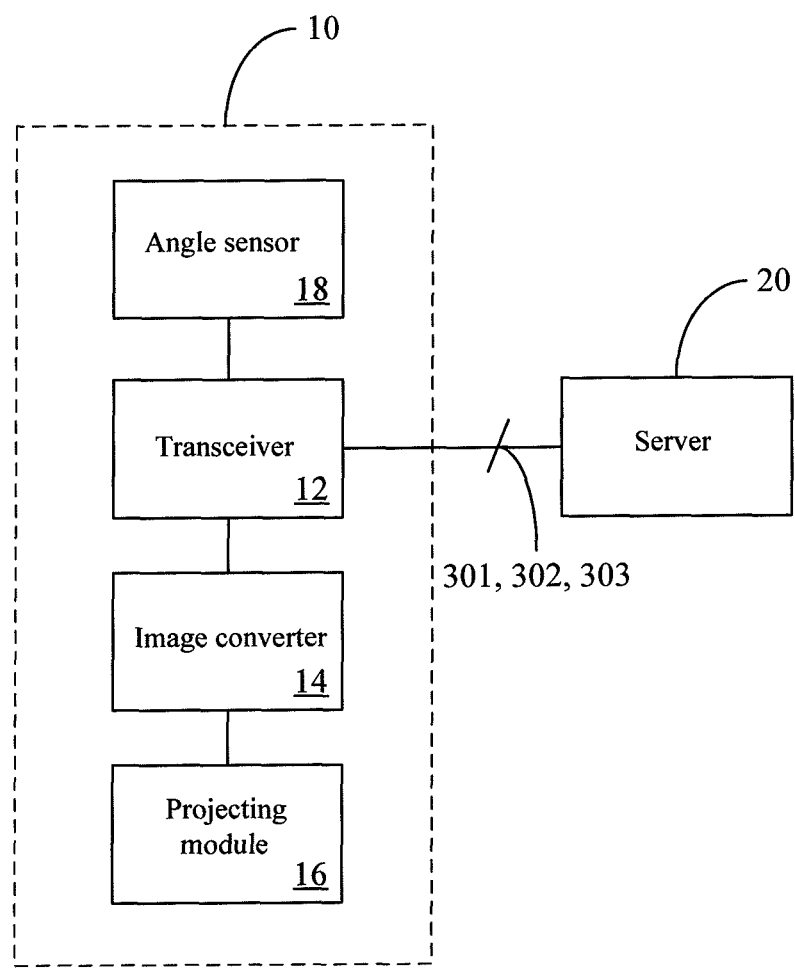
FIG. 1 is a schematic block diagram of a projector according to a first embodiment of the present invention.
Figure 2A:
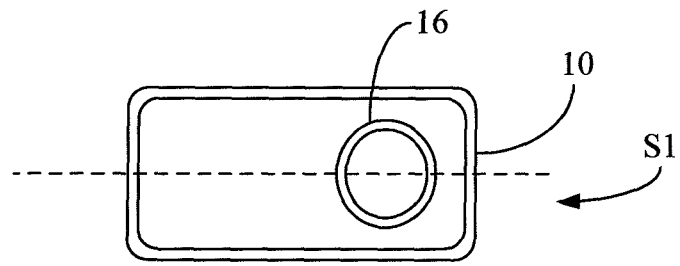
FIG. 2A and FIG. 2B are diagrams illustrating orientations of the projector according to the first embodiment of the present invention.
Figure 2B:
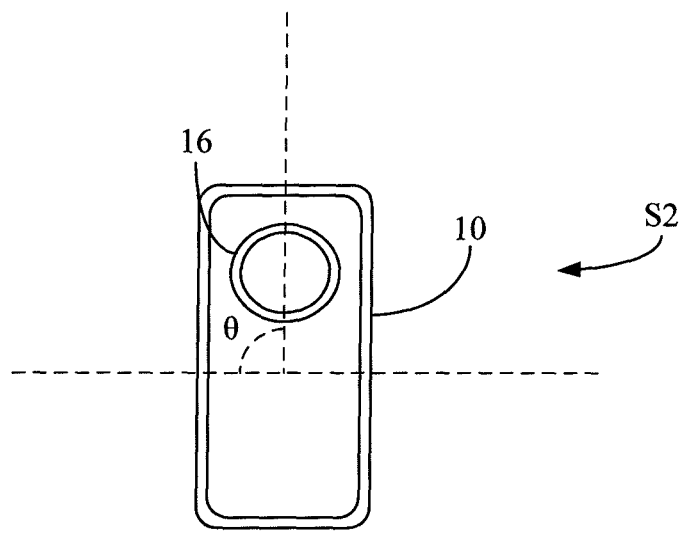
Figure 3A:
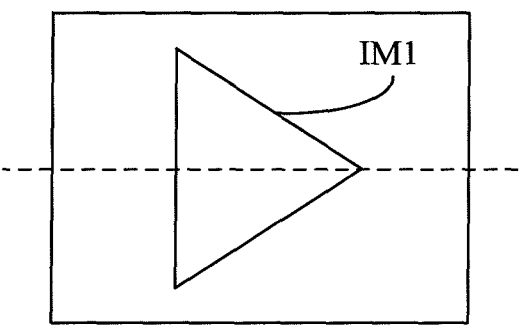
FIG. 3A to FIG. 3C are schematic views illustrating projection images of the projector according to the first embodiment of the present invention.
Figure 3B:
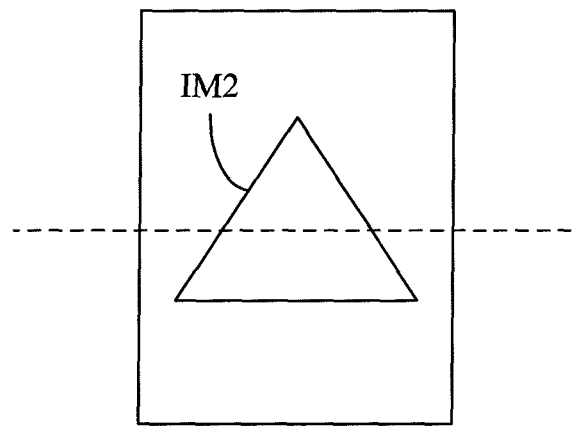
Figure 3C:
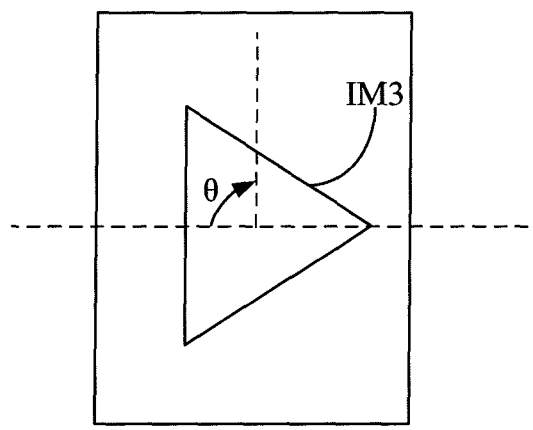

Referring firstly to FIG. 1, FIG. 2A, FIG. 2B, and FIG. 3A to FIG. 3C together, a first embodiment of the present invention is a projector 10. FIG. 1 is a schematic block diagram of the projector 10; FIG. 2A and FIG. 2B are schematic views illustrating orientations of the projector 10; and FIG. 3A to FIG. 3C are schematic views illustrating projection images of the projector. As shown in FIG. 1, the projector 10 comprises a transceiver 12, an image converter 14, a projecting module 16 and an angle sensor 18.

Specifically, the transceiver 12 is configured to receive an initial image signal 301 from a server 20. The image converter 14 (e.g., a graphics processing unit (GPU)) is electrically coupled to the transceiver 12 and configured to convert the initial image signal 301 into an initial image IM1. The projecting module 16 (e.g., an optical lens assembly or a digital micromirror device (DMD)) is electrically coupled to the image converter 14 and configured to project the initial image IM1 as shown in FIG. 3A at a first orientation S1 of the projector as shown in FIG. 2A. The first orientation S1 of the projector 10 refers to an initial orientation, which is preset to be horizontal.

Then, when the first orientation S1 of the projector 10 is changed to a second orientation S2 as shown in FIG. 2B, an angle difference value $\theta$ between the orientations will be generated for the projector 10. At this point, an image IM2 projected from the projecting module 16 of the projector 10 shall be as shown in FIG. 3B, and is shifted by the angle difference value $\theta$ from the initial image IM1. In order to make the images projected by the projecting module 16 all have an unchanged normal image aspect when being viewed by the user, the angle sensor 18 senses the angle difference value $\theta$ generated while the first orientation S1 of the projector 10 is changed to the second orientation S2, and generates an angle signal 302 according to the angle difference value $\theta$.

Then, the transceiver 12 transmits the angle signal 302 to the server 20 so that the server 20 generates a rotated image signal 303 according to the angle signal 302 and the initial image signal 301. The transceiver 12 further receives the rotated image signal 303 from the server 20, the image converter 14 generates a rotated image IM3 as shown in FIG. 3C according to the rotated image signal 303, and the projecting module 16 projects the rotated image IM3 at the second orientation S2. Thus, the initial image IM1 and the rotated image IM3 have the same image aspect. In detail, although the projector 10 is at the second orientation S2 which has the angle difference value $\theta$ from an absolutely horizontal angle of the initial orientation (i.e., the first orientation S1), the image IM2 to be projected has actually been adjusted to be the rotated image IM3 that has the same image aspect as the initial image IM1.

It shall be particularly appreciated that, the transceiver 12 of the projector 10 is connected to the server 20 via a serial port or a network. If the transceiver 12 of the projector 10 is connected to the server 20 via the network, then the initial image signal 301 and the rotated image signal 303 may be transmitted in the form of compressed image signals so as to reduce the waste in bandwidth of the network.

Furthermore, the server 20 may also detect in comparison with different pixel data between the initial image signal 301 and an image signal after rotation, and then generate the rotated image signal 303 according to the different pixels between the two images so that the rotated image signal 303 only comprises the different pixels between the two images. Therefore, when the rotated image signal 303 is transmitted to the transceiver 12 of the projector 10, the image converter 14 of the projector 10 can generate the rotated image IM3 simply according to the initial image signal 301 and the different pixels represented by the rotated image signal 303 so that the projecting module 16 of the projector 10 projects the rotated image IM3 at the second orientation S2 of the projector 10. In this way, the data traffic can be reduced.

Figure 4:
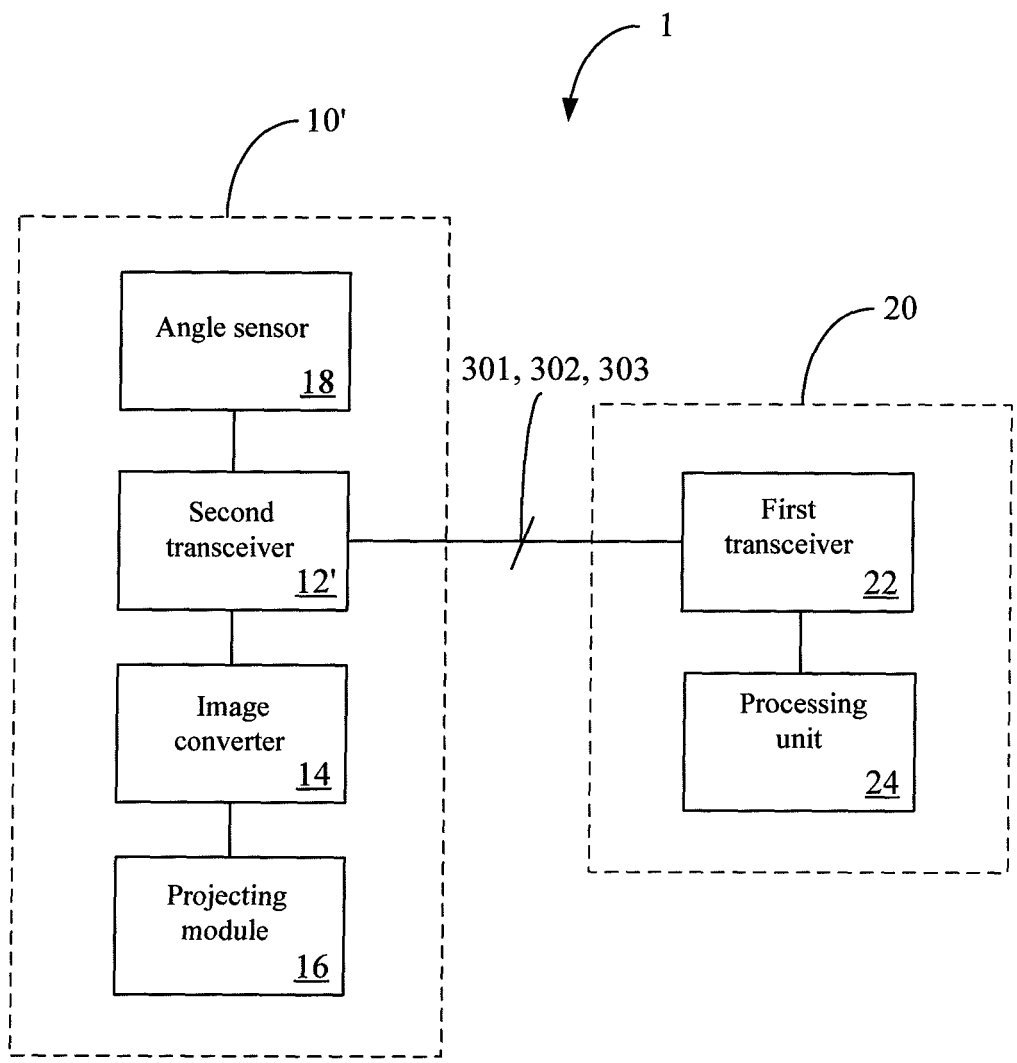
FIG. 4 is a schematic view of a projecting system according to a second embodiment of the present invention.

Referring next to FIG. 4, there is shown a schematic view of a projecting system 1 according to a second embodiment of the present invention. The projecting system 1 comprises a projector 10' and a server 20. The server 20 of the projecting system 1 further comprises a first transceiver 22 and a processing unit 24. It shall be particularly appreciated that, elements bearing the same reference numerals as those of the first embodiment have similar functions in the second embodiment, and thus will not be further described herein. The second embodiment differs from the first embodiment only in names of the transceivers.

Specifically, the processing unit 24 of the server 20 is configured to generate an initial image signal 301, and the first transceiver 22 is configured to transmit the initial image signal 301 to a second transceiver 12' of the projector 10'. After the initial image signal 301 is received by the second transceiver 12' of the projector 10' from the server 20, an image converter 14 of the projector 10' converts the initial image signal 301 into an initial image IM1. After receiving the image signal from the image converter 14, a projecting module 16 projects the initial image IM1 at a first orientation S1.

Likewise, when the projector 10' is changed from the first orientation S1 to a second orientation S2, an angle difference value θ will be generated for the projector 10'. Then, an image projected from the projecting module 16 of the projector 10' shall be as shown by the image IM2, and is shifted by the angle difference value θ from the initial image IM1. In this case, an angle sensor 18 senses the angle difference value θ generated while the first orientation S1 of the projector 10' is changed to the second orientation S2, and generates an angle signal 302 according to the angle difference value θ.

Then, after the angle signal 302 is received by the first transceiver 22 of the server 20, the processing unit 24 generates a rotated image signal 303 according to the angle signal 302 and the initial image signal 301, and transmits the rotated image signal 303 to the second transceiver 12' of the projector 10' through the first transceiver 22 again. Thus, the image converter 14 of the projector 10' can generate a rotated image IM3 according to the rotated image signal 303, and the projecting module 16 projects the rotated image at the second orientation S2 of the projector 10' so that the rotated image IM3 has the same image aspect as the initial image IM1.

It shall be particularly appreciated that, the server may calculate and generate the rotated image signal 303 through a vector calculation according to the angle signal 302 and the initial image signal 301 so that the initial image IM1 is adjusted into the rotated image IM3. The vector calculation is represented by the following formula:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

where x and y represent two coordinate values of each pixel with respect to the initial image signal 301, and x' and y' represent two coordinate values of each pixel with respect to the rotated image signal 303.

Additionally, referring to FIG. 5 together, a specific rotated angle corresponding table, Table 1 is shown therein. Specifically, for some specific angles such as 15°, 30° or 90°, the server 20 may calculate and generate the rotated image signal 303 directly according to the angle signal 302, the initial image signal 301 and values corresponding to the individual angles at the specific rotated angle corresponding table, Table 1 so that the initial image IM1 is adjusted into the rotated image IM3 without the need of calculating the sin θ and cos θ values. For example, supposing that the angle difference value θ generated when the projector 10' is changed from the first orientation S1 to the second orientation S2 is 90°, then the server 20 obtains sin θ and cos θ values corresponding to 90° (which are 1.00 and 0.00 respectively) according to the specific rotated angle corresponding table, Table 1, and then substitutes the values into the aforesaid vector calculation formula. Thus, it can be known that the two coordinate values of each pixel with respect to the rotated image signal shall be (x', y')=(−y, x).

Furthermore, the images that can be projected by the projecting module 16 of the projector 10' are fixed in shape, so if the processing unit 24 of the server 20 controls the projecting module 16 of the projector 10' to project the rotated image IM3 on the original scale of the initial image IM1, then some portions of the initial image IM1 might be sacrificed. On the other hand, similarly, if the processing unit 24 of the server 20 controls the projecting module 16 of the projector 10' to project the rotated image IM3 with contents of the whole image of the initial image IM1 being kept, then the display scale of the rotated image IM3 shall be adjusted to be smaller than that of the initial image IM1. Thus, if blank or black portions in the image projected by the projecting module 16 are caused due to adjustment of the rotated image IM3, then the server 20 may also fill the portions according to colors of surrounding portions of the initial image IM1 or the rotated image IM3.

Figure 6:
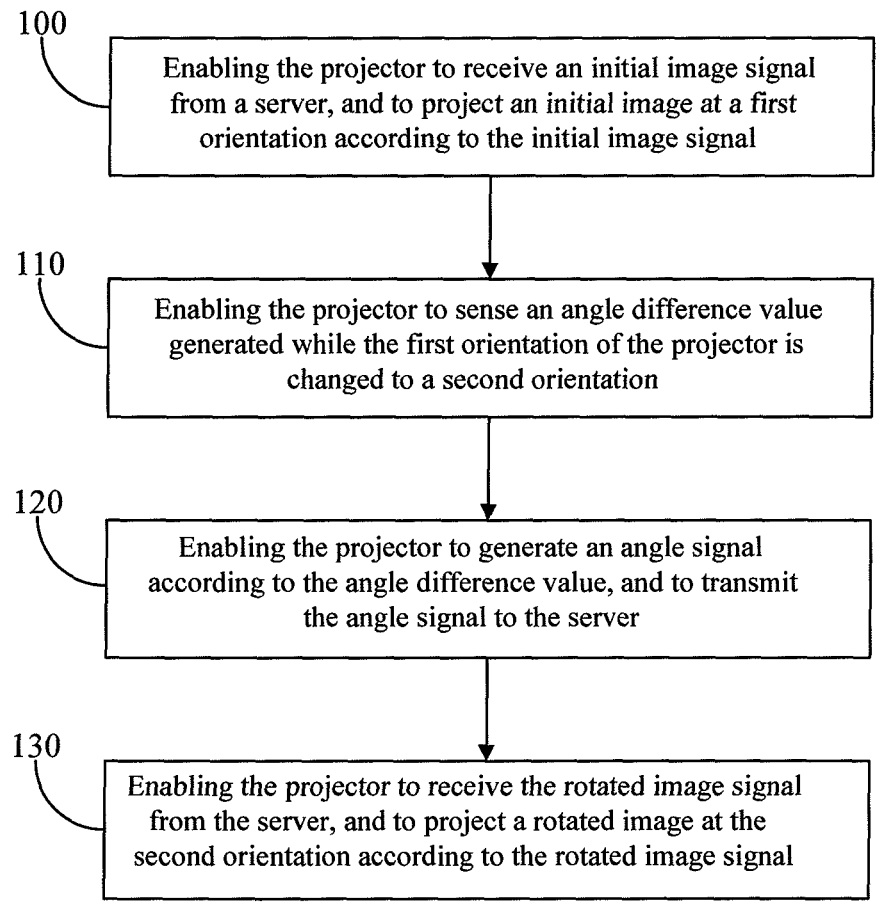
FIG. 6 is a flowchart diagram of an automatic image adjusting method according to a third embodiment of the present invention.

A third embodiment of the present invention is an automatic image adjusting method, a flowchart diagram of which is shown in FIG. 6. The method of the third embodiment is for use in a projector (e.g., the projector 10 described in the first embodiment). The projector co-operates with a server. Detailed steps of the automatic image adjusting method are as follows.

Firstly, step 100 is executed to enable the projector to receive an initial image signal from the server, and to project an initial image at a first orientation according to the initial image signal. Then, step 110 is executed to enable the projector to sense an angle difference value generated while the first orientation of the projector is changed to a second orientation. Thereafter, step 120 is executed to enable the projector to generate an angle signal according to the angle difference value, and to transmit the angle signal to the server so that the server generates a rotated image signal according to the angle signal and the initial image signal. Then, step 130 is executed to enable the projector to receive the rotated image signal from the server, and to project a rotated image at the second orientation according to the rotated image signal. The image projected at the first orientation and the rotated image projected at the second orientation have the same image aspect.

Further speaking, the projector is connected to the server via a serial port or a network. If the projector is connected to the server via the network, then the image signal and the rotated image signal may be transmitted in the form of compressed image signals so as to reduce the waste in bandwidth of the network.

Furthermore, the server may also detect in comparison with different pixel data between the initial image signal and an image signal after rotation, and then generate the rotated image signal according to the different pixels between the two images so that the rotated image signal only comprises the different pixels between the two images. Therefore, when the rotated image signal is transmitted to the projector, the projector can generate the rotated image simply according to the initial image signal and the different pixels represented by the rotated image signal so that the projector projects the rotated image at the second orientation. In this way, the data traffic can be reduced.

Figure 7:
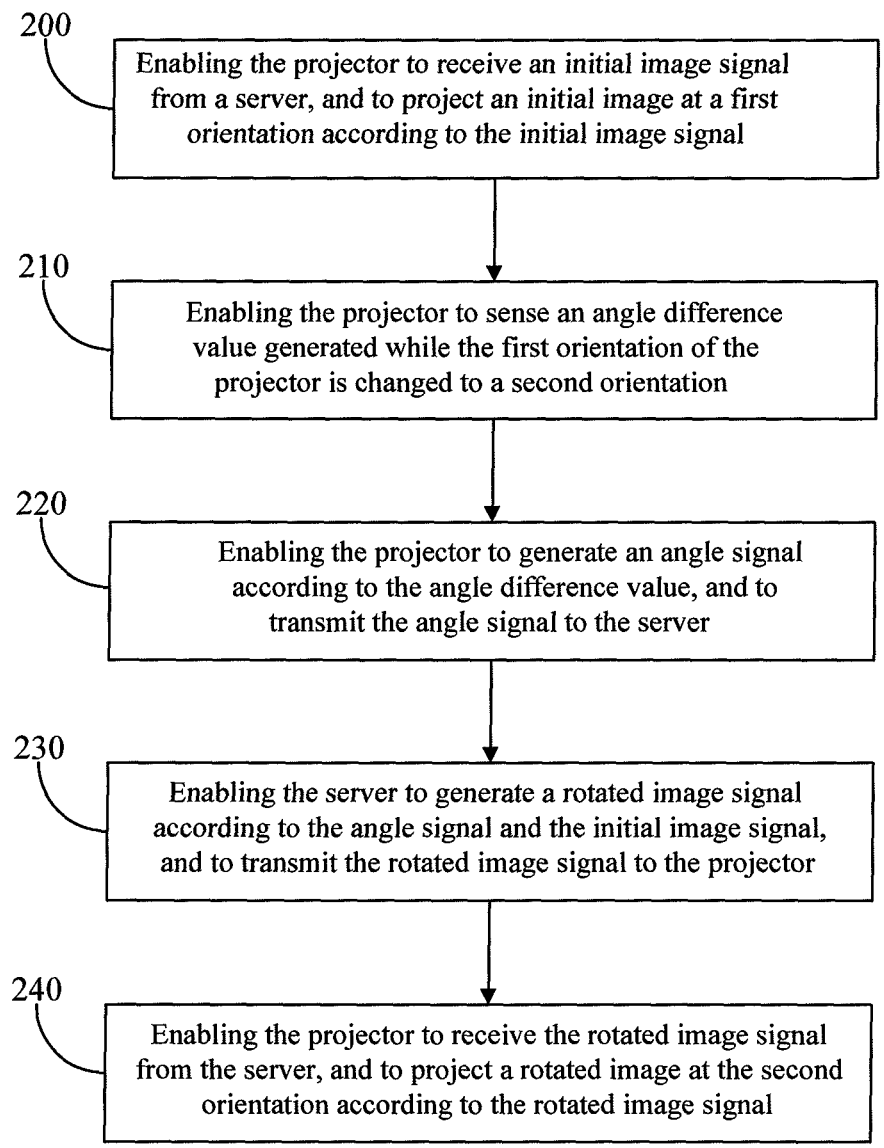
FIG. 7 is a flowchart diagram of an automatic image adjusting method according to a fourth embodiment of the present invention.

A fourth embodiment of the present invention is an automatic image adjusting method, a flowchart diagram of which is shown in FIG. 7. The method of the fourth embodiment is for use in a projecting system (e.g., the projecting system 1 described in the second embodiment). The projecting system comprises a projector and a server, which co-operate with each other. Detailed steps of the automatic image adjusting method are as follows.

It shall be firstly appreciated that, a step 200, a step 210 and a step 220 in the fourth embodiment are the same as the step 100, the step 110 and the step 120 in the third embodiment respectively, and thus will not be further described. After the step 220 is executed, step 230 is executed to enable the server to generate a rotated image signal according to the angle signal and the initial image signal, and to transmit the rotated image signal to the projector. Then, step 240 is executed to enable the projector to receive the rotated image signal from the server, and to project a rotated image at the second orientation according to the rotated image signal. The initial image projected by the projector at the first orientation and the rotated image projected at the second orientation have the same image aspect.

Further speaking, the projector is connected to the server via a serial port or a network. If the projector is connected to the server via the network, then the initial image signal and the rotated image signal may be transmitted in the form of compressed image signals so as to reduce the waste in bandwidth of the network.

Furthermore, the server may also detect in comparison with different pixel data between the initial image signal and an image signal after rotation, and then generate the rotated image signal according to the different pixels between the two images so that the rotated image signal only comprises the different pixels between the two images. Therefore, when the rotated image signal is transmitted to the projector, the projector can generate the rotated image simply according to the initial image signal and the different pixels represented by the updated rotated image signal so that the projector projects the rotated image at the second orientation. In this way, the data traffic can be reduced.

Likewise, the server may calculate and generate the rotated image signal through a vector calculation according to the angle signal and the initial image signal. The vector calculation is represented by the following formula:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

where x and y represent two coordinate values of each pixel with respect to the initial image signal, and x' and y' represent two coordinate values of each pixel with respect to the rotated image signal.

Additionally, referring to FIG. 5 together, a specific rotated angle corresponding table, Table 1 is shown therein. Specifically, for some specific angles such as 15°, 30° or 90°, the server may calculate and generate the rotated image signal directly according to the angle signal, the initial image signal and values corresponding to the individual angles at the specific rotated angle corresponding table, Table 1 so that the initial image is adjusted into the rotated image without the need of calculating the sin θ and cos θ values. For example, supposing that the angle difference value θ generated when the projector is changed from the first orientation to the second orientation is 90°, then the server obtains sin θ and cos θ values corresponding to 90° (which are 1.00 and 0.00 respectively) according to the specific rotated angle corresponding table, Table 1, and then substitutes the values into the aforesaid formula of the vector calculation. Thus, it can be known that the two coordinate values of each pixel with respect to the rotated image signal shall be (x', y')=(−y, x).

On the other hand, the images that can be projected by the projector are fixed in shape, so if the server controls the projector to project the rotated image on the original scale of the initial image, then some portions of the initial image might be sacrificed. On the other hand, similarly, if the server controls the projector to project the rotated image with contents of the whole image of the initial image being kept, then the display scale of the rotated image will be adjusted to be smaller than that of the initial image. Thus, if blank or black portions in the image projected by the projector are caused due to adjustment of the rotated image, then the server may also fill the portions according to colors of surrounding portions of the initial image or the rotated image.

According to the above descriptions, the projector, the projecting system comprising the projector and the automatic image adjusting method thereof of the present invention can automatically adjust the image aspect according to the change in orientation when the user changes the orientation of the projector. In this way, convenience in operation of the projector is improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An automatic image adjusting method for use in a projector, the projector co-operating with a server, the automatic image adjusting method comprising the following steps:
    (a) enabling the projector to receive an initial image signal from the server, and to project an initial image at a first orientation according to the initial image signal;
    (b) enabling the projector to sense an angle difference value generated while the first orientation of the projector is changed to a second orientation;
    (c) enabling the projector to generate an angle signal according to the angle difference value, and to transmit the angle signal to the server so that the server generates a rotated image signal according to the angle signal and the initial image signal; and
    (d) enabling the projector to receive the rotated image signal from the server, and to project a rotated image at the second orientation according to both of the rotated image signal and the initial image signal, wherein the rotated image and the initial image have the same image aspect, and the rotated image signal includes difference content between an image signal after rotation and the initial image signal.

2. The automatic image adjusting method as claimed in claim 1, wherein the projector connects to the server via a serial port.

3. The automatic image adjusting method as claimed in claim 1, wherein the projector connects to the server via a network.

4. The automatic image adjusting method as claimed in claim 3, wherein the initial image signal and the rotated image signal received by the projector are compressed image signals.

5. A projector, comprising:
    a transceiver, being configured to receive an initial image signal from a server;

an image converter electrically coupled to the transceiver, being configured to convert the initial image signal into an initial image;

a projecting device electrically coupled to the image converter, that projects the initial image at a first orientation of the projector; and an angle sensor, being configured to sense an angle difference value generated while the first orientation of the projector is changed to a second orientation, and to generate an angle signal according to the angle difference value;

wherein, the transceiver transmits the angle signal to the server so that the server generates a rotated image signal according to the angle signal and the initial image signal, the transceiver receives the rotated image signal from the server, the image converter generates a rotated image according to both of the rotated image signal and the initial image signal, the projecting device projects the rotated image at the second orientation of the projector, the rotated image and the initial image have the same image aspect, and the rotated image signal includes difference content between an image signal after rotation and the initial image signal.

6. The projector as claimed in claim 5, wherein the projector connects to the server via a serial port.

7. The projector as claimed in claim 5, wherein the projector connects to the server via a network.

8. The projector as claimed in claim 7, wherein the initial image signal and the rotated image signal received by the transceiver are compressed image signals.

9. An automatic image adjusting method for use in a projecting system, the projecting system comprising a projector and a server, the automatic image adjusting method comprising the following steps:

(a) enabling the projector to receive an initial image signal from the server, and to project an initial image at a first orientation according to the initial image signal;

(b) enabling the projector to sense an angle difference value generated while the first orientation of the projector is changed to a second orientation;

(c) enabling the projector to generate an angle signal according to the angle difference value, and to transmit the angle signal to the server;

(d) enabling the server to determine difference content between the initial image signal and an image after rotation, and to generate a rotated image signal according to the difference content, the angle signal and the initial image signal, and to transmit the rotated image signal to the projector; and (e) enabling the projector to receive the rotated image signal from the server, and to project a rotated image at the second orientation according to both of the rotated image signal and the initial image signal, wherein the rotated image and the initial image have the same image aspect.

10. The automatic image adjusting method as claimed in claim 9, wherein the projector connects to the server via a serial port.

11. The automatic image adjusting method as claimed in claim 9, wherein the projector connects to the server via a network.

12. The automatic image adjusting method as claimed in claim 11, wherein, before transmitting, the server compresses the initial image signal and the rotated image signal.

13. The automatic image adjusting method as claimed in claim 9, wherein the step (d) further comprises the following step of:

(d1) enabling the server to generate the rotated image signal via one of a vector calculation and a specific rotated angle corresponding table according to the angle signal and the initial image signal.

14. A projecting system, comprising:
a server, comprising:
a processor that generates an initial image signal; and
a first transceiver electrically coupled to the processor being configured to transmit the initial image signal; and a projector, comprising:
a second transceiver, being configured to receive the initial image signal from the server;
an image converter electrically coupled to the second transceiver, being configured to convert the initial image signal into an initial image;
a projecting device electrically coupled to the image converter, that projects the initial image at a first orientation of the projector; and
an angle sensor, being configured to sense an angle difference value generated while the first orientation of the projector is changed to a second orientation, and to generate an angle signal according to the angle difference value;

wherein, the second transceiver transmits the angle signal to the server while the first orientation of the projector is changed to the second orientation, the processor determines difference content between the initial image signal corresponding to the first orientation and an image signal after rotation and generates a rotated image signal according to the signal difference content, the angle signal and the initial image signal after the first transceiver receives the angle signal, the first transceiver transmits the rotated image signal to the projector, the image converter generates a rotated image according to both of the rotated image signal and the initial image signal corresponding to the first orientation after the second transceiver receives the rotated image signal, the projecting device projects the rotated image at the second orientation, and the rotated image and the initial image projected by the projector at the first orientation have the same image aspect.

15. The projecting system as claimed in claim 14, wherein the projector connects to the server via a serial port.

16. The projecting system as claimed in claim 14, wherein the projector connects to the server via a network.

17. The projecting system as claimed in claim 16, wherein the processor of the server compresses the initial image signal and the rotated image signal before the first transceiver transmits the initial image signal and the rotated image signal.

18. The projecting system as claimed in claim 14, wherein the processor further generates the rotated image signal via one of a vector calculation and a specific rotated angle corresponding table according to the angle signal and the initial image signal.

* * * * *